(12) United States Patent
Uehane et al.

(10) Patent No.: US 11,053,894 B2
(45) Date of Patent: Jul. 6, 2021

(54) MULTI-CYLINDER ENGINE

(71) Applicant: Mazda Motor Corporation, Hiroshima (JP)

(72) Inventors: Yoshiyuki Uehane, Hiroshima (JP); Daijirou Ishimoto, Hatsukaichi (JP); Atsuhiro Hatabu, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 9 days.

(21) Appl. No.: 16/247,781

(22) Filed: Jan. 15, 2019

(65) Prior Publication Data
US 2019/0226427 A1 Jul. 25, 2019

(30) Foreign Application Priority Data
Jan. 23, 2018 (JP) .............................. JP2018-008518

(51) Int. Cl.
*F02F 1/42* (2006.01)
*F02M 26/21* (2016.01)
*F02B 37/02* (2006.01)
*F02F 1/24* (2006.01)
*F02M 26/14* (2016.01)
(Continued)

(52) U.S. Cl.
CPC ............... *F02M 26/21* (2016.02); *F01N 3/20* (2013.01); *F02B 37/02* (2013.01); *F02F 1/243* (2013.01); *F02F 1/4264* (2013.01); *F02M 26/14* (2016.02); *F02M 26/25* (2016.02); *F02M 26/34* (2016.02); *F02M 26/41* (2016.02); *F02M 26/43* (2016.02);
(Continued)

(58) Field of Classification Search
CPC ........ F02M 26/21; F02M 26/14; F02M 26/25; F02M 26/34; F02M 26/41; F02M 26/43; F01N 3/20; F02B 37/02; F02F 1/243; F02F 1/4264
See application file for complete search history.

(56) References Cited

U.S. PATENT DOCUMENTS

| 4,993,227 A | * | 2/1991 | Nagura | .................... F02B 75/20 |
| | | | | 60/605.1 |
| 6,425,381 B1 | * | 7/2002 | Rammer | ................ F02M 26/05 |
| | | | | 123/568.12 |

(Continued)

FOREIGN PATENT DOCUMENTS

JP H11294264 A 10/1999

*Primary Examiner* — Gonzalo Laguarda
(74) *Attorney, Agent, or Firm* — Alleman Hall Creasman & Tuttle LLP

(57) ABSTRACT

A multi-cylinder engine includes an engine body having first and second cylinder groups, first and second exhaust passage groups each having a plurality of independent exhaust passage parts and a collective exhaust passage part, and an exhaust gas recirculation (EGR) passage. In a plan view in cylinder axis directions, the passage groups are disposed adjacent to each other, and, in the first exhaust passage group, a first independent exhaust part of the plurality of independent exhaust passage parts is connected to the EGR passage and a second independent exhaust passage part is connected to the collective exhaust passage part so as to be directed to a connection of the first independent exhaust passage part to the collective exhaust passage part, and in the second exhaust passage group, an opening of the collective exhaust passage part is offset toward the first exhaust passage group in a lineup direction.

11 Claims, 9 Drawing Sheets

(51) Int. Cl.
　　　*F02M 26/41*　　　(2016.01)
　　　*F01N 3/20*　　　(2006.01)
　　　*F02M 26/43*　　　(2016.01)
　　　*F02M 26/25*　　　(2016.01)
　　　*F02M 26/34*　　　(2016.01)
　　　*F02B 75/20*　　　(2006.01)

(52) U.S. Cl.
　　　CPC ....... *F02B 75/20* (2013.01); *F02F 2001/4278* (2013.01)

(56) References Cited

U.S. PATENT DOCUMENTS

| | | | |
|---|---|---|---|
| 6,513,506 B1* | 2/2003 | Ito | F02F 1/243 |
| | | | 123/193.5 |
| 9,945,305 B2* | 4/2018 | Osumi | F02D 41/0062 |
| 10,450,976 B2* | 10/2019 | Han | F02B 37/00 |
| 2017/0175669 A1* | 6/2017 | Kawakami | F01P 3/02 |
| 2017/0284284 A1* | 10/2017 | Takamiya | F02B 39/005 |
| 2018/0216550 A1* | 8/2018 | Idicheria | F02M 26/41 |

\* cited by examiner

MULTI-CYLINDER ENGINE

TECHNICAL FIELD

The present disclosure relates to a multi-cylinder engine, and particularly to a structure of an exhaust passage connected to an EGR passage.

BACKGROUND OF THE DISCLOSURE

Some conventional engines for vehicles are provided with an EGR (Exhaust Gas Recirculation) device to recirculate a portion of exhaust gas to an intake passage. By providing the EGR device to the engine, since an excessive increase in temperature of combustion gas is prevented, generation of nitrogen oxide ($NO_x$) and intake pumping loss can be reduced.

JP1999-294264A discloses a structure of an engine provided with EGR passages which connect an exhaust passage to an intake passage. In this engine, the EGR passages are connected to some of a plurality of independent exhaust pipes connected to respective cylinders of an engine body.

However, since the engine can take out EGR gas (recirculated exhaust gas) substantially only from some of the independent exhaust pipes to which the EGR passages are connected, the supply of EGR gas to the intake passage may vary.

In addition, since the engine can take out the EGR gas only from some of the independent exhaust pipes, unburnt gas may be sent to the intake passage if the corresponding cylinders to which the independent exhaust pipes are connected misfire.

If only the stable supply of the EGR gas to the intake passage is a concern, the EGR passages may be connected to all of the independent exhaust pipes; however, this solution may cause an increase in the engine size, as well as a reduction in the exhaust efficiency.

SUMMARY OF THE DISCLOSURE

The present disclosure is made in view of addressing the above problems, and one purpose thereof is to provide a multi-cylinder engine which can suppress a reduction in exhaust efficiency, while stably supplying EGR gas to an intake passage.

According to one aspect of the present disclosure, a multi-cylinder engine is provided. The engine includes an engine body having a first cylinder group comprised of a first plurality of cylinders disposed adjacent to each other, and a second cylinder group comprised of a second plurality of cylinders disposed adjacent to each other and provided adjacent to the first cylinder group, a first exhaust passage group having a first plurality of independent exhaust passage parts connected to the first cylinder group, respectively, and a first collective exhaust passage part collecting the first plurality of independent exhaust passage parts at downstream ends in an exhaust gas flow direction, and having an opening at the downstream side in the exhaust gas flow direction, a second exhaust passage group having a second plurality of independent exhaust passage parts connected to the second cylinder group, respectively, and a second collective exhaust passage part collecting the second plurality of independent exhaust passage parts at downstream ends in the exhaust gas flow direction, and having an opening at the downstream side in the exhaust gas flow direction, and an exhaust gas recirculation (EGR) passage connected at one end to a first independent exhaust passage part of the first plurality of independent exhaust passage parts and connected at the other end to an intake passage. In a plan view of the first exhaust passage group and the second exhaust passage group in cylinder axis directions, the first exhaust passage group and the second exhaust passage group are disposed adjacent to each other. In the plan view, a second independent exhaust part of the first plurality of independent exhaust passage parts, different from the first independent exhaust passage part to which the EGR passage is connected, is connected to the first collective exhaust passage part so as to be directed to a connection of the first independent exhaust passage part to the first collective exhaust passage part. In the plan view, the opening of the second collective exhaust passage part is offset toward the first exhaust passage group in a lineup direction of the second plurality of independent exhaust passage parts.

According to this structure, in the first exhaust passage group, the EGR passage is connected to the first independent exhaust passage part, and the second independent exhaust passage part is connected to the first collective exhaust passage part so as to direct to the connection of the first independent exhaust passage part to the first collective exhaust passage part. That is, in the connection of the second independent exhaust passage part to the first collective exhaust passage part, at least a component of the direction of the second independent exhaust passage part is positioned toward the connection of the first independent exhaust passage part to the first collective exhaust passage part. Thus, in the engine according to this structure, the exhaust gas is introduced into the EGR passage from the second independent exhaust passage part, as well as from the first independent exhaust passage part. Therefore, the engine can supply the EGR gas more stably to the intake passage.

Moreover, in the engine according to this structure, since, in the second exhaust passage group, the opening of the second collective exhaust passage part is offset toward the first exhaust passage group, the exhaust gas sent to the second collective exhaust passage part through the second plurality of independent exhaust passage parts have the same directional component. In other words, in the second exhaust passage group to which the EGR passage is not connected, in order to secure the exhaust efficiency as high as possible, the opening of the second collective exhaust passage part is provided so that the directional components of the exhaust gas (i.e., components in the flow direction) match each other. Therefore, in the engine according to this structure, the high exhaust efficiency in the second exhaust passage group can be secured.

Therefore, the engine according to this structure can stably supply the EGR gas to the intake passage, while suppressing the reduction in the exhaust efficiency.

In the plan view, the opening of the first collective exhaust passage part may be disposed closer to a center in a lineup direction of the first plurality of independent exhaust passage parts, compared with the opening of the second collective exhaust passage part.

According to this structure, the opening of the first collective exhaust passage part is formed substantially at the center in the plan view. Thus, in the first exhaust passage group, the flow directions of the exhaust gas sent through the first plurality of independent exhaust passage parts to the first collective exhaust passage part have mutually different directional components. Thus, by utilizing these different directional components of exhaust gas depending on the independent exhaust passage parts, at least part of the exhaust gas from the second independent exhaust passage part can be sent through the first independent exhaust passage to the EGR passage.

Fuel may be injected alternately over time to the first cylinder group and the second cylinder group.

According to this structure, since the engine executes the control of fuel injection so that the fuel is injected alternately over time to the first cylinder group and the second cylinder group, exhaust interference is reduced and higher exhaust efficiency is achieved.

The engine body may have a cylinder head. The first exhaust passage group and the second exhaust passage group may be formed by exhaust ports of the cylinder head.

According to this structure, the first exhaust passage group and the second exhaust passage group are formed by exhaust ports of the cylinder head. Thus, the exhaust gas passing through both of the exhaust passage groups are cooled by using a water jacket formed in the cylinder head. Moreover, the engine can be entirely downsized.

The multi-cylinder engine may further include an exhaust-pipe part having a first exhaust-pipe part connected to the first exhaust passage group in the cylinder head, a second exhaust-pipe part connected to the second exhaust passage group in the cylinder head, and a collective exhaust-pipe part collecting the first exhaust-pipe part and the second exhaust-pipe part at downstream ends in the exhaust gas flow direction.

According to this structure, the exhaust gas sent through the first exhaust passage group is sent to the collective exhaust-pipe part through the first exhaust-pipe part, and the exhaust gas sent through the second exhaust passage group is sent to the collective exhaust-pipe part through the second exhaust-pipe part. Thus, the portions of exhaust gas are rectified in their flow directions by the first and second exhaust-pipe parts, and are then sent to the collective exhaust-pipe part, thereby improving the exhaust efficiency.

The exhaust-pipe part may be connected at a downstream end in the exhaust gas flow direction to a turbocharger.

According to this structure, since the engine is provided with the turbocharger, the kinetic energy of the exhaust gas can be collected to improve the efficiency.

The second exhaust-pipe part may be formed so that a central path thereof extending to the collective exhaust-pipe part is more linear than a central path of the first exhaust-pipe part.

According to this structure, since the central path of the second exhaust-pipe part extends linearly as compared with the central path of the first exhaust-pipe part, the exhaust gas discharged through the second exhaust passage group can be led to the turbocharger with high efficiency. Therefore, the engine according to this structure achieves a higher efficiency.

In the plan view, the first independent exhaust passage part may be disposed farther from the second exhaust passage group, and the second independent exhaust passage part may be disposed closer to the second exhaust passage group.

According to this structure, the first independent exhaust passage part and the second independent exhaust passage part are disposed opposite sides of each other among the first exhaust passage group in the lineup direction of the plurality of independent exhaust passage parts. Thus, at least a portion of the exhaust gas from the second independent exhaust passage part efficiently outflows through the first independent exhaust passage part to the EGR passage. Therefore, the engine according to this structure supplies the EGR gas more stably to the intake passage.

DETAILED DESCRIPTION OF THE DISCLOSURE

Hereinafter, one embodiment of the present disclosure is described, taking the accompanying drawings into consideration. Note that the form in the following description is one mode of the present disclosure, and therefore, the present disclosure is not to be limited by the following form at all except for the essential structure of the present disclosure.

Embodiment

1. Outline Structure of Multi-Cylinder Engine 2

An outline structure of a multi-cylinder engine 2 (hereinafter, simply referred to as "the engine") is described using FIG. 1.

Figure 1:
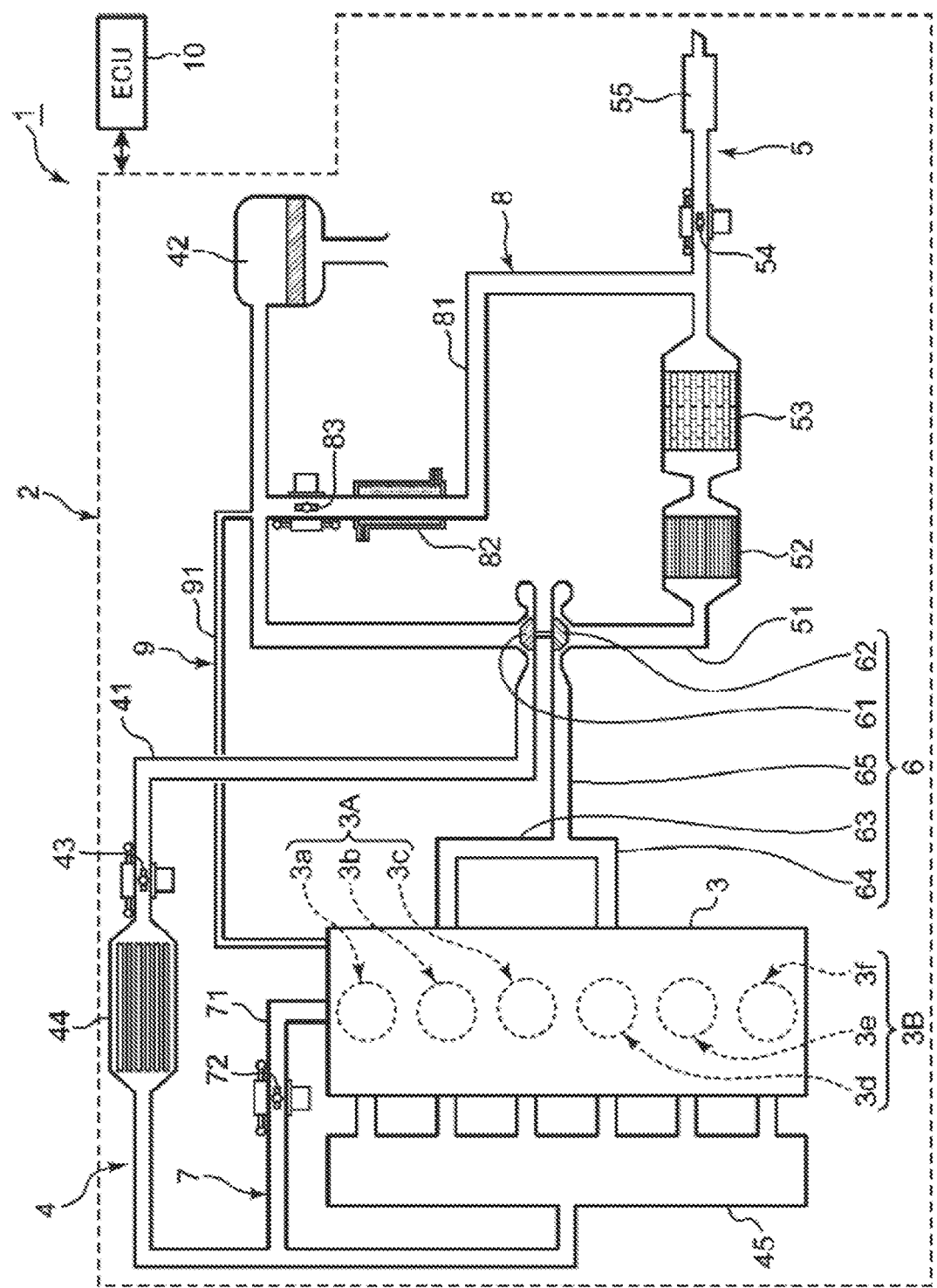
FIG. 1 is a view schematically illustrating a structure of an engine for a vehicle according to one embodiment of the present disclosure.

As illustrated in FIG. 1, a vehicle 1 according to this embodiment includes, in addition to the engine 2 mounted on the vehicle 1, an ECU (Engine Control Unit) 10 which executes a driving control of the engine 2.

The engine 2 includes an engine body 3, an intake system 4, an exhaust system 5, and a turbocharger 6. In this embodiment, the engine body 3 adopts a multi-cylinder diesel engine having six cylinders 3a-3f, as one example.

The intake system 4 has an intake passage 41 connected to intake ports (not illustrated) of the engine body 3. An air cleaner 42 is provided at an upstream end of the intake passage 41, and fresh air is taken into the intake passage 41 through the air cleaner 42.

The intake passage 41 is provided with a compressor 61 of the turbocharger 6, a throttle valve 43, an intercooler 44, and a surge tank 45. Air flowing through the intake passage 41 is boosted by the compressor 61 of the turbocharger 6, and is then sent to the intercooler 44 through the throttle valve 43. The intercooler 44 cools the air which is increased in temperature due to the compression by the compressor 61.

Opening and closing of the throttle valve 43 is controlled during operation of the engine 2 so that the throttle valve 43 fundamentally maintains being in or near a fully-open state. The throttle valve 43 is closed only when it is necessary, e.g., when the engine 2 is stopped.

The surge tank 45 is provided immediately in front of a connection of the intake system 4 with the intake ports (not illustrated) of the engine body 3 to equalize an inflow air amount to the cylinders 3a-3f.

The exhaust system 5 has an exhaust passage 51 which is connected at one end to the part where a turbine 62 of the turbocharger 6 is provided. The exhaust passage 51 is provided with a DOC (Diesel Oxidation Catalyst) 52, a DPF (Diesel Particulate Filter) 53, an exhaust shutter valve 54, and a silencer 55.

The DOC 52 detoxicates CO and HC in exhaust gas discharged from the engine body 3 by oxidizing, and the DPF 53 captures particulates, such as soot, contained in the exhaust gas. The exhaust shutter valve 54 is provided between the DPF 53 and the silencer 55 in the exhaust passage, which is a valve to control a flow rate of the exhaust gas discharged outside through the silencer 55.

The turbocharger 6 includes, in addition to the compressor 61 and the turbine 62, a casing passage part 63 (i.e., a first exhaust-pipe part), a casing passage part 64 (i.e., a second exhaust-pipe part), and a casing collected part 65 (i.e., a collective exhaust-pipe part). The casing passage part 63 is connected to a first cylinder group 3A comprised of the cylinders 3a-3c, and the casing passage part 64 is connected to a second cylinder group 3B comprised of the cylinders 3d-3f. The casing collected part 65 is a pipe part at which the casing passage part 63 and the casing passage part 64 are collected, and is connected to the part where the turbine 62 is provided.

The engine 2 further includes an HP-EGR (High Pressure-Exhaust Gas Recirculation) device 7, an LP-EGR (Low Pressure-Exhaust Gas Recirculation) device 8, and a blowby gas device 9. The HP-EGR device 7 has an HP-EGR passage (EGR passage) 71. The HP-EGR passage 71 is provided so as to connect the intake passages 41 to the cylinder head of the engine body 3. Note that the connected part of the HP-EGR passage 71 to the intake passage 41 is located between the surge tank 45 and the intercooler 44. An EGR valve 72 is provided to the HP-EGR passage 71. The EGR valve 72 adjusts the flow rate of the exhaust gas recirculated to the intake passage 41.

The LP-EGR device 8 has an LP-EGR passage 81. The LP-EGR passage 81 is provided so as to connect the exhaust passage 51 to the intake passage 41. The connected part of the LP-EGR passage 81 to the exhaust passage 51 is located between the DPF 53 and the exhaust shutter valve 54. The connected part of the LP-EGR passage 81 to the intake passage 41 is located between the air cleaner 42 and the compressor 61 of the turbocharger 6.

An EGR cooler 82 and an EGR valve 83 are provided to the LP-EGR passage 81. The EGR valve 83 adjusts the flow rate of the exhaust gas recirculated to the intake passage 41, similar to the EGR valve 72 in the HP-EGR device 7. The EGR cooler 82 is provided in order to cool the exhaust gas to be recirculated to the intake passage 41.

The blowby gas device 9 has a blowby gas passage 91. The blowby gas passage 91 is provided so as to connect a head cover of the engine body 3 to the intake passage 41. The blowby gas passage 91 returns the blowby gas generated inside the engine body 3 to the intake passage 41.

The ECU 10 executes, for example, a control of fuel-injection timing in the engine body 3, and an opening-and-closing control of the various valves 43, 54, 72, and 83.

2. Outside Structure of Engine 2

Figure 2:
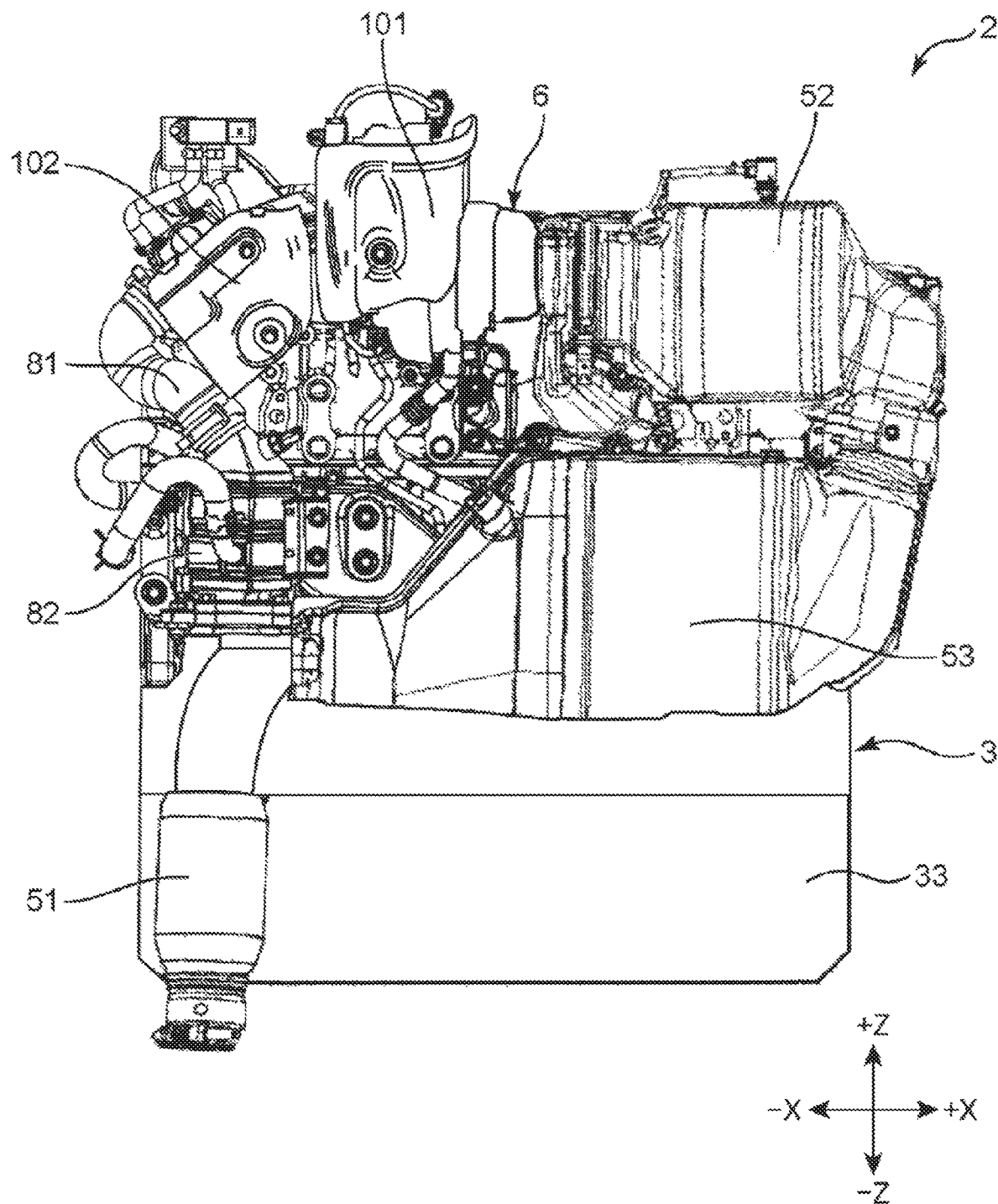
FIG. 2 is a side view schematically illustrating the engine.
Figure 3:
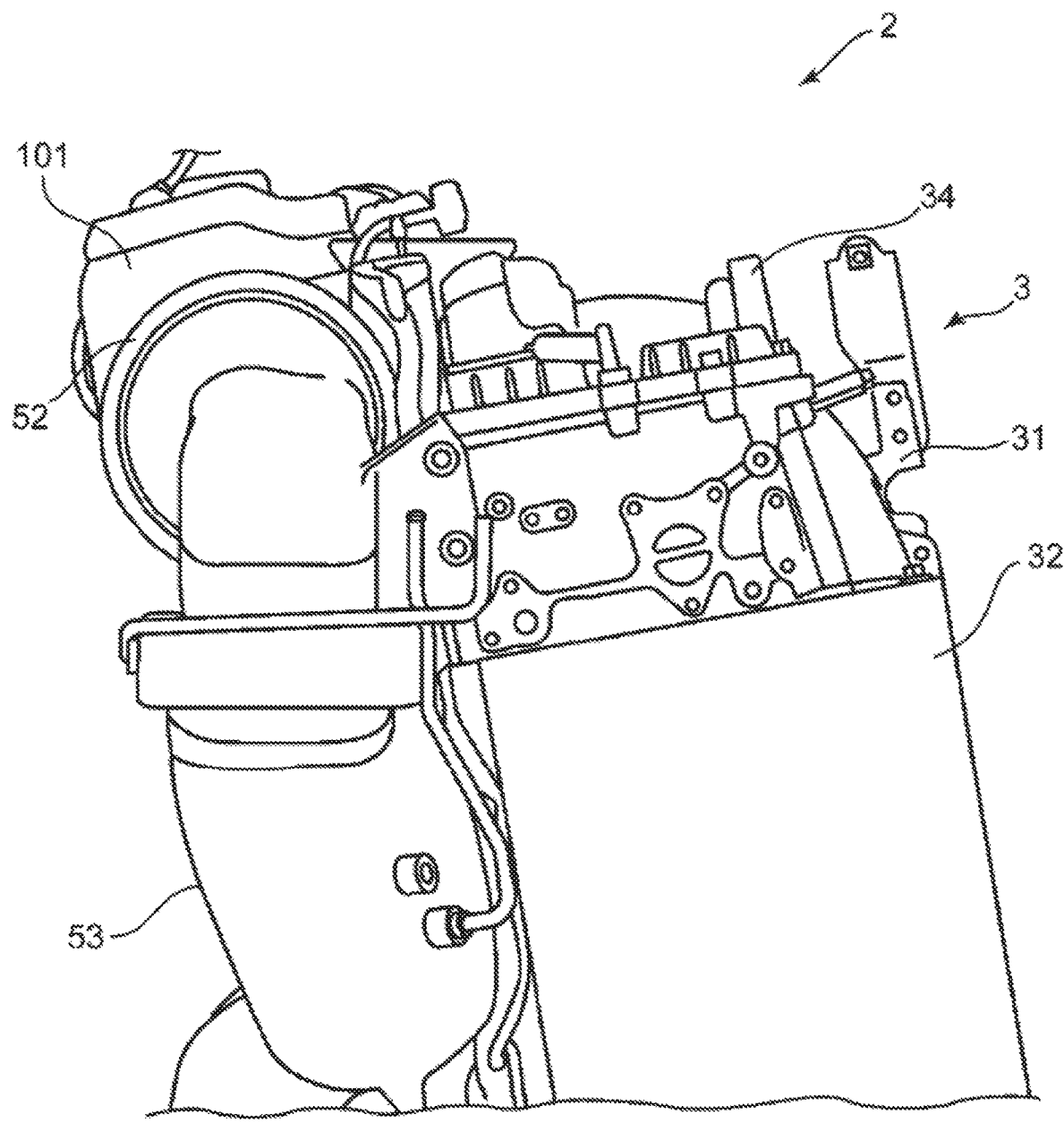
FIG. 3 is a front view schematically illustrating the engine.

The outside structure of the engine 2 is described using FIGS. 2 and 3. FIG. 2 is a side view schematically illustrating the engine 2, and FIG. 3 is a front view schematically illustrating the engine 2.

As illustrated in FIGS. 2 and 3, the LP-EGR passage 81 and the EGR cooler 82 of the LP-EGR device 8, the DOC 52 and the DPF 53 of the exhaust system 5, and the turbocharger 6 are disposed along a side surface part on the −Y side of the engine body 3 of the engine 2. The LP-EGR passage 81 is provided so as to connect an upstream part of the compressor 61 (see FIG. 1) of the turbocharger 6 disposed on the +Z side to a downstream part of the DPF 53 disposed on the −Z side. The EGR cooler 82 is disposed substantially in the Z-directions.

As illustrated in FIG. 2, the exhaust system 5 is curved in a substantially U-shape between the DOC 52 and the DPF 53. The exhaust passage 51 is bent at a part downstream of the DPF 53 (downstream in the exhaust gas flow direction) to the −Z side (toward an oil pan 33 of the engine body 3) and to the −Y side (toward a viewer of FIG. 2).

As illustrated in FIG. 3, the DOC 52 of the exhaust system 5 is disposed on the −Y side of and close to a cylinder-head 31 and a head cover 34 of the engine body 3. The DPF 53 is disposed on the −Y side of and close to a cylinder block 32 of the engine body 3.

As illustrated in FIG. 2, a cover 101 and a cover 102 are disposed on the −X side of the turbocharger 6. These covers 101 and 102 are insulated.

In this embodiment, a variable displacement turbocharger is adopted as the turbocharger 6. Thus, the turbocharger has a VGT (variable geometry turbine) actuator which varies the displacement (detailed illustration is omitted). The cover 101 is provided in order to protect the VGT actuator from heat radiated from the engine body 3 and the DPF 53 which are located nearby.

Similarly, the cover 102 is provided in order to protect the EGR valve 83 (illustration is omitted in FIGS. 2 and 3) of the LP-EGR device 8 from the heat radiated from the engine body 3 and the DPF 53 which are located nearby. Note that the covers 101 and 102 may be separately or integrally formed.

3. Spatial Relation Between Cylinder Head 31 and Turbocharger 6

Figure 4:
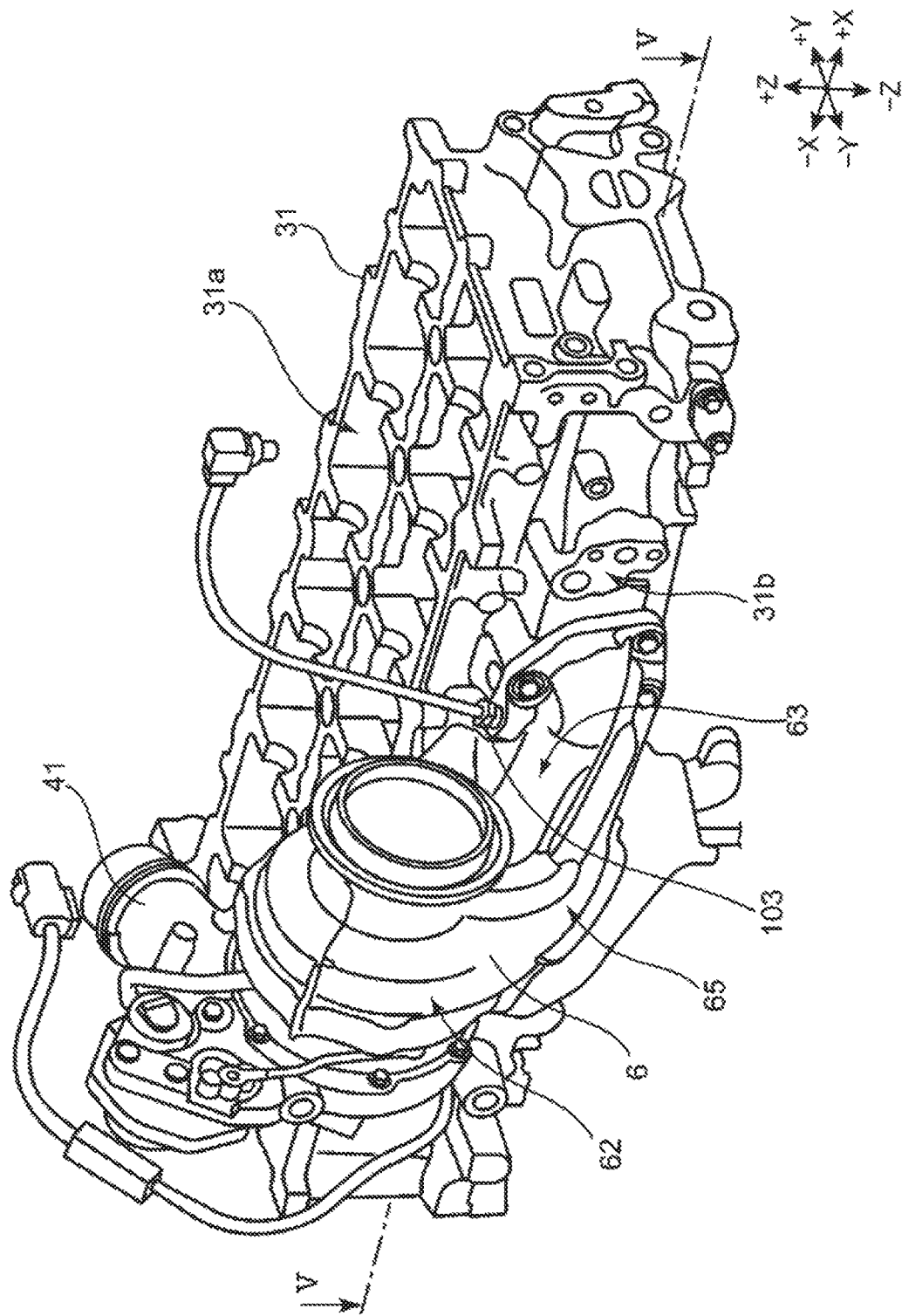
FIG. 4 is a perspective view schematically illustrating a cylinder head and a turbocharger which are removed from the engine.

A spatial relation between the cylinder head 31 and the turbocharger 6 is described using FIG. 4. FIG. 4 is a perspective view schematically illustrating the cylinder head 31 and the turbocharger 6 which are removed from the engine 2.

As illustrated in FIG. 4, the cylinder head 31 has a substantially rectangular parallelepiped shape elongated in the X-directions. The +Z side of the cylinder head 31 is opened (i.e., an upper opening 31a), and is closed by the head cover 34 (see FIG. 3) attached thereto.

The turbocharger 6 is disposed along a side surface part 31b of the cylinder head 31 on the −Y side. The casing passage parts 63 and 64 (in FIG. 4, only the casing passage part 63 is illustrated for convenience of illustration) of the turbocharger 6 are connected to openings of the exhaust ports formed in the side surface part 31b of the cylinder head 31. This will be described later.

The casing collected part 65 following the casing passage parts 63 and 64 is bent to the +Z side at the −Y side of the casing passage parts 63 and 64. The casing collected part 65 is connected to the turbine 62.

Note that an exhaust gas temperature sensor 103 which detects the temperature of the exhaust gas is attached to the casing passage part 63.

4. Structures of Exhaust Ports 31c-31h and 31j-31o, and Port Collected Parts 31i and 31p of Cylinder Head 31

Figure 5:
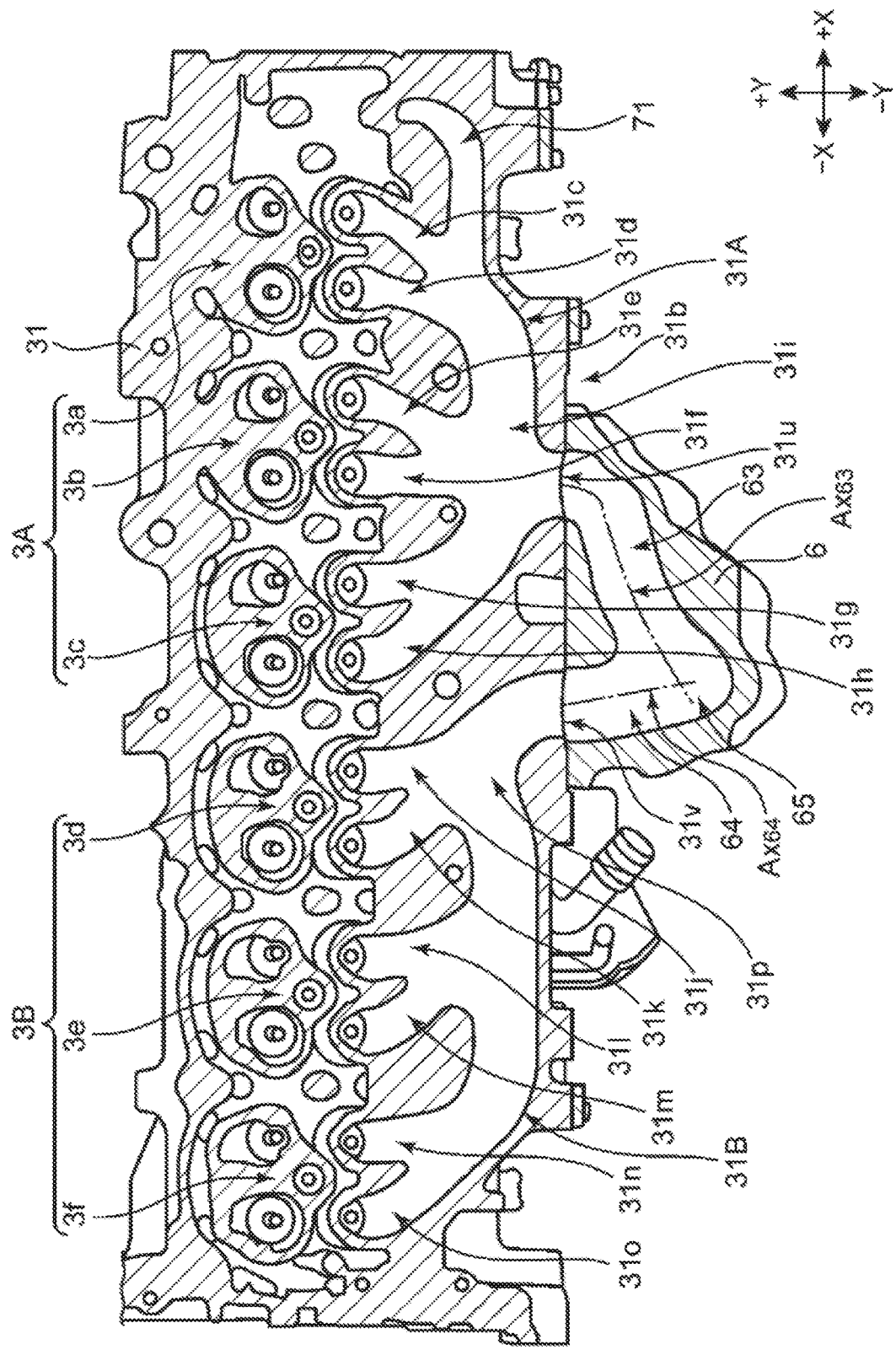
FIG. 5 is a cross-sectional view schematically illustrating a structure of exhaust ports and a port collected part in the cylinder head, taken along a line V-V in FIG. 4.

Structures of exhaust ports 31c-31h and 31j-31o and port collected parts 31i and 31p in the cylinder head 31 are described using FIG. 5. FIG. 5 is a schematic cross-sectional view taken along a line V-V in FIG. 4.

As illustrated in FIG. 5, in the engine body 3 according to this embodiment, from the +X side, a first cylinder 3a, a second cylinder 3b, a third cylinder 3c, a fourth cylinder 3d, a fifth cylinder 3e, and a sixth cylinder 3f are disposed in this order. Note that in FIG. 5, reference characters 3a-3f are assigned in order to indicate the locations corresponding to the cylinders 3a-3f in the cylinder head 31.

In this embodiment, a group comprised of the first cylinder 3a to the third cylinder 3c is referred to as the first cylinder group 3A, and a group comprised of the fourth cylinder 3d to the sixth cylinder 3f is referred to as the second cylinder group 3B. In the engine 2 according to this embodiment, the driving control is carried out so that the fuel is not injected successively to the first cylinder 3a to the third cylinder 3c belonging to the first cylinder group 3A, and similarly, the fuel is not injected successively to the fourth cylinder 3d to the sixth cylinder 3f belonging to the second cylinder group 3B. For example, in the engine 2, fuel is injected in the order of the first cylinder 3a=>the fifth cylinder 3e=>the third cylinder 3c=>the sixth cylinder 3f=>the second cylinder 3b=>the fourth cylinder 3d.

The first cylinder 3a is connected to the exhaust port 31c (independent exhaust passage part) and the exhaust port 31d (independent exhaust passage part). Similarly, the second cylinder 3b is connected to the exhaust port 31e (independent exhaust passage part) and the exhaust port 31f (independent exhaust passage part), and the third cylinder 3c is connected to the exhaust port 31g (independent exhaust passage part) and the exhaust port 31h (independent exhaust passage part).

The exhaust ports 31c-31h are collected at the port collected part 31i provided on the −Y side of the cylinder head 31. In this embodiment, the exhaust ports 31c-31h and the port collected part 31i are collectively referred to as a first exhaust port group 31A (i.e., first exhaust passage group). That is, in this embodiment, the exhaust passages provided corresponding to the first cylinder group 3A are referred to as the first exhaust port group 31A.

The casing passage part 63 of the turbocharger 6 is connected to the port collected part 31i of the first exhaust port group 31A. Specifically, the casing passage part 63 is connected to an opening 31u of the port collected part 31i on the exhaust gas downstream side.

The fourth cylinder 3d is connected to an exhaust port 31j (independent exhaust passage part) and an exhaust port 31k (independent exhaust passage part), and the fifth cylinder 3e is connected to an exhaust port 31l (independent exhaust passage part) and an exhaust port 31m (independent exhaust passage part), and the sixth cylinder 3f is connected to an exhaust port 31n (independent exhaust passage part) and an exhaust port 31o (independent exhaust passage part).

The exhaust ports 31j-31o are collected at the port collected part 31p provided on the −Y side of the cylinder head 31. In this embodiment, similarly to the above, the exhaust ports 31j-31o and the port collected part 31p are collectively referred to as a second exhaust port group 31B (i.e., second exhaust passage group).

The casing passage part 64 of the turbocharger 6 is connected to the port collected part 31p of the second exhaust port group 31B. Specifically, the casing passage part 64 is connected to an opening 31v of the port collected part 31p on the exhaust gas downstream side.

In the first exhaust port group 31A, in the X-directions, the opening 31u of the port collected part 31i is disposed substantially at the center in a range from a part where the exhaust port 31c is connected to the first cylinder 3a to a part where the exhaust port 31h is connected to the third cylinder 3c. In other words, as for the opening 31u of the port collected part 31i, the port collected part 31i is disposed on the −Y side of a part where the exhaust port 31f is connected to the second cylinder 3b. That is, in the first exhaust port group 31A, the exhaust ports 31c-31h have the same length (substantially the same length).

On the other hand, in the second exhaust port group 31B, in the X-directions, the opening 31v of the port collected part 31p is disposed so as to be offset to the +X side (toward the first exhaust port group 31A) from the center of a range from the part where the exhaust port 31j is connected to the fourth cylinder 3d to a part where the exhaust port 31o is connected to the sixth cylinder 3f. More specifically, the opening 31v of the port collected part 31p is disposed on the +X side from the part where the exhaust port 31j is connected to the fourth cylinder 3d.

As illustrated in FIG. 5, the casing passage part 64 is formed so as to extend substantially linearly between the part connected to the port collected part 31p to the part connected to the casing collected part 65. That is, a central path (i.e., center axis) $Ax_{64}$ of the casing passage part 64 is formed substantially linearly between the opening 31v of the port collected part 31p and the casing collected part 65.

On the other hand, the casing passage part 63 has a portion bent toward the −X side between the part connected to the port collected part 31i and the part connected to the casing collected part 65. That is, a central path $Ax_{63}$ of the casing passage part 63 is formed so as to be bent between the opening 31u of the port collected part 31i and the casing collected part 65.

As illustrated in FIG. 5, in the cylinder head 31 of the engine body 3, the HP-EGR passage 71 is selectively connected only to the exhaust port 31c. At least a part of the HP-EGR passage 71 is formed in the cylinder head 31. In this embodiment, the exhaust port 31c corresponds to a "first independent exhaust passage part."

The HP-EGR passage 71 extends to the +X side from the part connected to the exhaust port 31c, and is bent to the +Y side at a tip end portion thereof. The HP-EGR passage 71 is connected to a part on the +Y side of a junction part with the exhaust port 31d of the exhaust port 31c (on the upstream in the exhaust gas flow direction).

5. Structure of First Exhaust Port Group 31A

Figure 6:
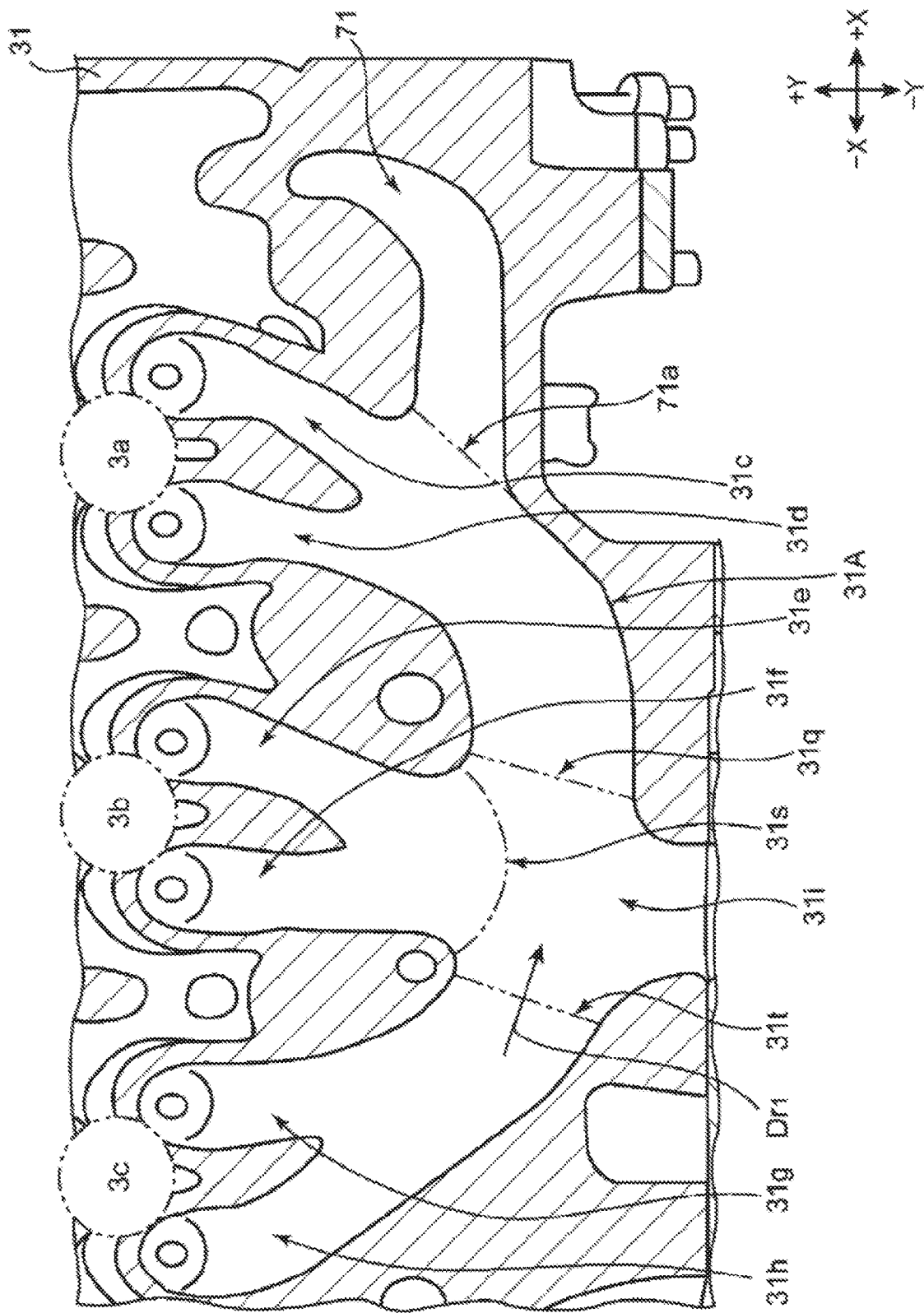
FIG. 6 is an enlarged view of FIG. 5, which mainly illustrates a first exhaust port group.

A structure of the first exhaust port group 31A is described using FIG. 6. FIG. 6 is an enlarged view of FIG. 5, which mainly illustrates the first exhaust port group 31A.

As illustrated in FIG. 6, in this embodiment, a part at which the exhaust ports 31c and 31d are connected to the port collected part 31i is referred to as a connection 31q, a part at which the exhaust ports 31e and 31f are connected to the port collected part 31i is referred to as a connection 31s, and a part at which the exhaust ports 31g and 31h are connected to the port collected part 31i is referred to as a connection 31t. Moreover, in this embodiment, a part at which the HP-EGR passage 71 is connected to the exhaust port 31c is referred to as a connection 71a.

According to the definitions, the exhaust ports 31g and 31h of the first exhaust port group 31A is directed to the connection 31q at the connection 31t. In other words, a directing axis $Dr_1$ of the exhaust ports 31g and 31h at the connection 31t has a component directed to the connection 31q of the exhaust ports 31c and 31d.

Note that the exhaust ports 31g and 31h in this embodiment correspond to a "second independent exhaust passage part" in the present disclosure.

6. Flow of Exhaust Gas in First Exhaust Port Group 31A

Figure 7:
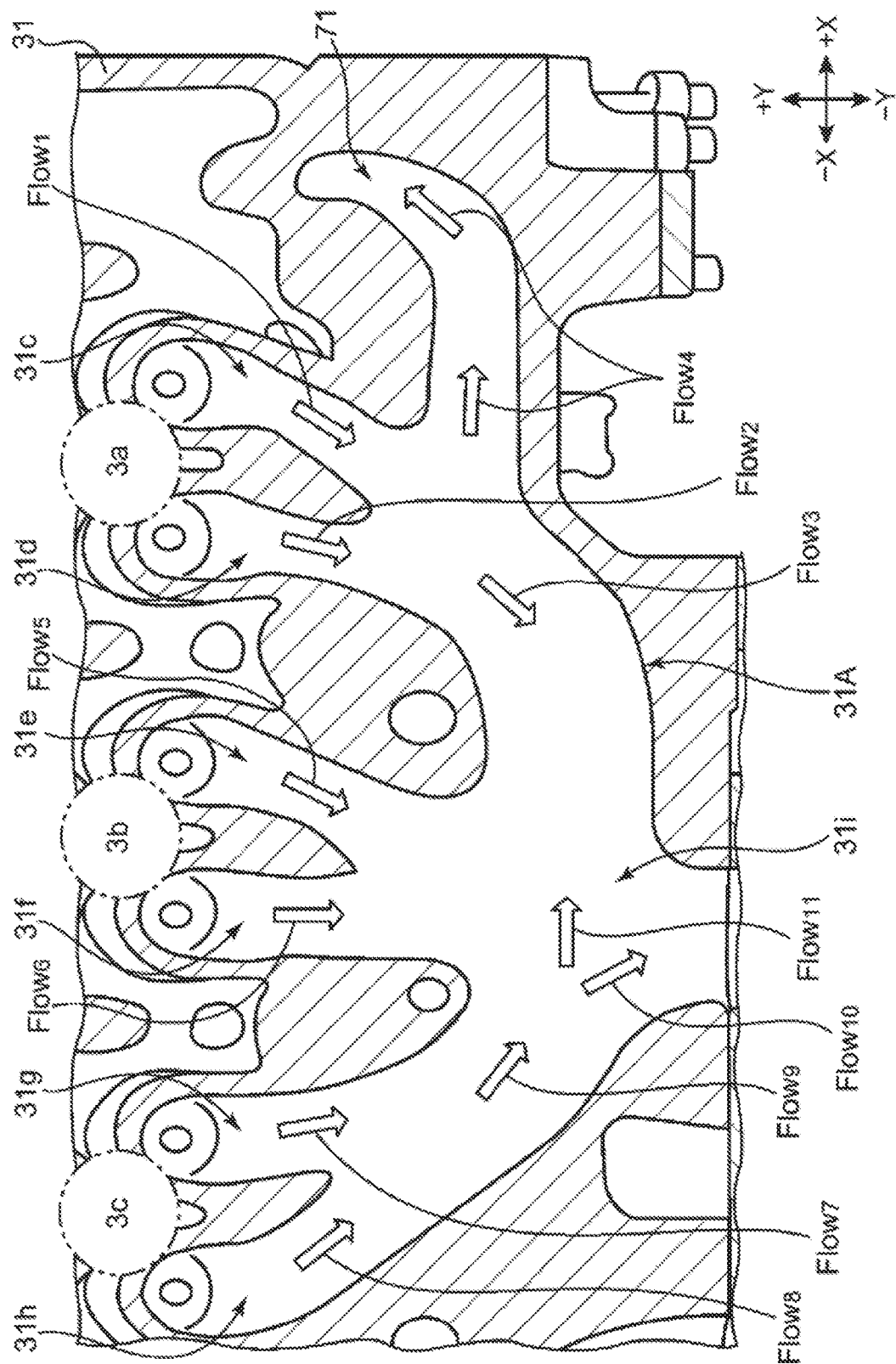
FIG. 7 is a view schematically illustrating a flow of exhaust gas in the first exhaust port group.

A flow of the exhaust gas in the first exhaust port group 31A is described using FIG. 7. FIG. 7 is a view schematically illustrating the flow of the exhaust gas in the first exhaust port group 31A.

As illustrated in FIG. 7, in the first exhaust port group 31A, the exhaust gas discharged from the first cylinder 3a flows through the exhaust ports 31c and 31d (as Exhaust Gas $Flow_1$ and $Flow_2$, respectively), and the $Flow_1$ and $Flow_2$ then join with each other immediately downstream of a part where the HP-EGR passage 71 is connected (as Exhaust Gas $Flow_3$). The joined exhaust gas ($Flow_3$) outflows from the port collected part 31i to the casing passage part 63.

A portion of the exhaust gas discharged from the first cylinder 3a and flowing through the exhaust port 31c outflows to the HP-EGR passage 71 (as Exhaust Gas $Flow_4$). This exhaust gas portion serves as the EGR gas which recirculates to the intake passage 41.

From the second cylinder 3b, the exhaust gas is discharged, and it flows through the exhaust ports 31e and 31f (i.e., Exhaust Gas $Flow_5$ and $Flow_6$, respectively), and is sent to the port collected part 31i. The exhaust gas ($Flow_5$ and $Flow_6$) sent to the port collected part 31i outflows to the casing passage part 63.

From the third cylinder 3c, the exhaust gas is discharged, and it flows through the exhaust ports 31g and 31h (as Exhaust Gas $Flow_7$ and $Flow_8$, respectively), and the flows join with each other at a part upstream of the port collected part 31i (as Exhaust Gas $Flow_9$). A portion of the joined exhaust gas ($Flow_9$) outflows from the port collected part 31i to the casing passage part 63 (as Exhaust Gas $Flow_{10}$).

On the other hand, the remaining joined exhaust gas ($Flow_9$) is sent toward the exhaust port 31c from the port collected part 31i (as Exhaust Gas $Flow_{11}$). The exhaust gas ($Flow_{11}$) sent to the exhaust port 31c outflows to the HP-EGR passage 71 (Exhaust Gas $Flow_4$).

Note that when the exhaust gas ($Flow_{11}$) is sent toward the exhaust port 31c, since the exhaust valves of the first cylinder 3a are closed, the exhaust gas ($Flow_{11}$) is prevented from flowing toward the first cylinder 3a from the part of the exhaust port 31c where the HP-EGR passage 71 is connected, and outflows to the HP-EGR passage 71.

7. Flow of Exhaust Gas in Second Exhaust Port Group 31B

Figure 8:
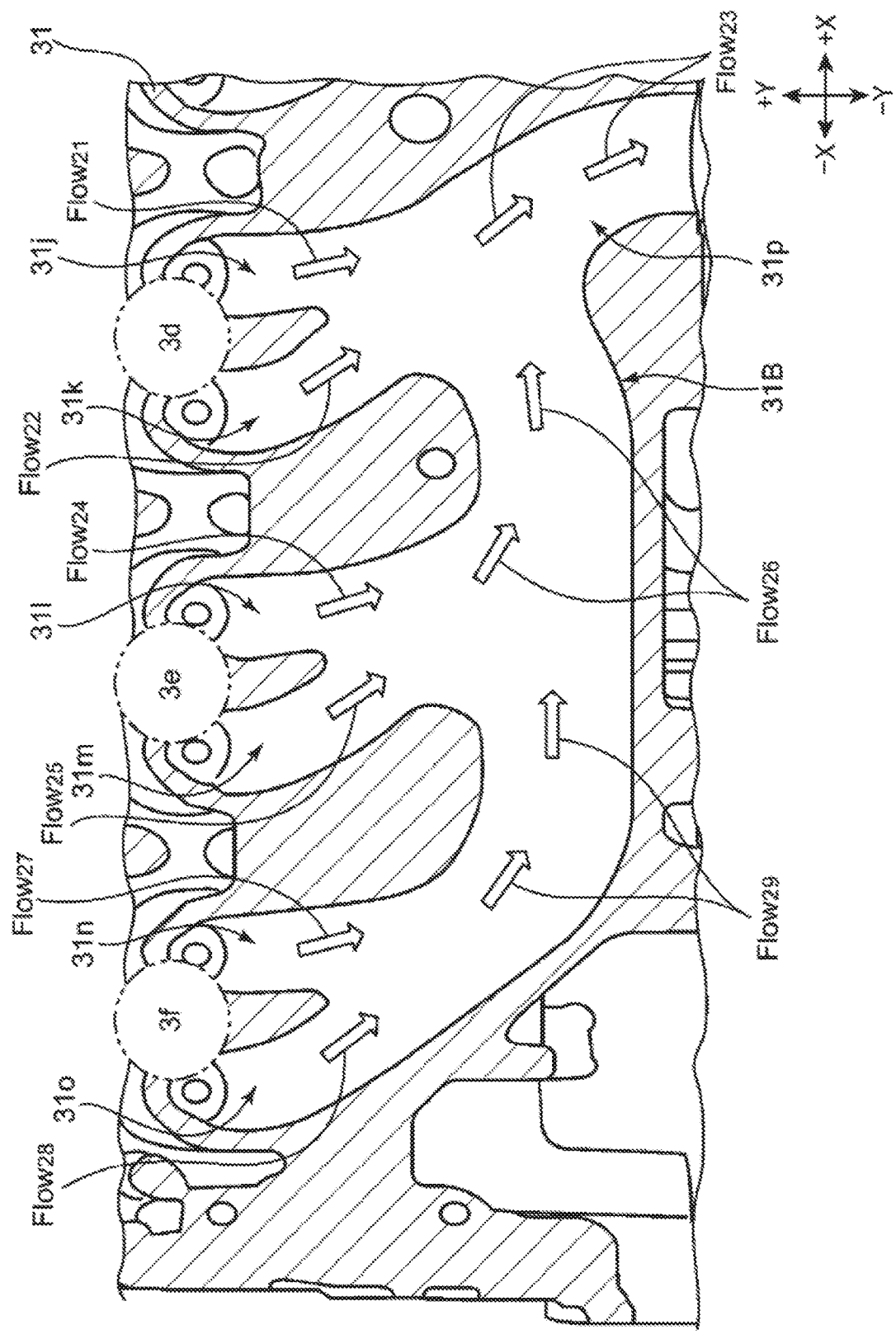
FIG. 8 is a view schematically illustrating a flow of exhaust gas in a second exhaust port group.

A flow of the exhaust gas in the second exhaust port group 31B is described using FIG. 8. FIG. 8 is a view schematically illustrating the flow of the exhaust gas in the second exhaust port group 31B.

As illustrated in FIG. 8, in the second exhaust port group 31B, from the fourth cylinder 3d, the exhaust gas is discharged, and it flows through the exhaust port 31j and the exhaust port 31k (as Exhaust Gas $Flow_{21}$ and $Flow_{22}$, respectively). The flows join with each other at a location immediately upstream of the port collected part 31p (as Exhaust Gas $Flow_{23}$). The joined exhaust gas ($Flow_{23}$) outflows from the port collected part 31p to the casing passage part 64. The flows ($Flow_{21}$, $Flow_{22}$, and $Flow_{23}$) of the exhaust gas from the fourth cylinder 3d to the casing passage part 64 are substantially linear flows with less exhaust resistance.

From the fifth cylinder 3e, the exhaust gas is discharged, and it flows through the exhaust port 31l and the exhaust port 31m (as Exhaust Gas $Flow_{24}$ and $Flow_{25}$, respectively). The discharged exhaust gas ($Flow_{24}$, $Flow_{25}$) joins together immediately after being discharged, and is then sent to the port collected part 31p (as $Flow_{26}$). The exhaust gas ($Flow_{26}$) sent to the port collected part 31p outflows to the casing passage part 64.

From the sixth cylinder 3f, exhaust gas is discharged, and it flows through the exhaust port 31n and the exhaust port 31o (as Exhaust Gas $Flow_{27}$ and $Flow_{28}$, respectively). The exhaust gas ($Flow_{27}$, $Flow_{28}$) joins together immediately after being discharged, and is then sent to the port collected part 31p (as $Flow_{29}$). The exhaust gas ($Flow_{29}$) sent to the port collected part 31p outflows to the casing passage part 64.

Note that since the order of fuel injection in the engine 2 is the first cylinder 3a=>the fifth cylinder 3e=>the third cylinder 3c=>the sixth cylinder 3f=>the second cylinder 3b=>the fourth cylinder 3d, as described above, it is difficult to cause exhaust interference in the second exhaust port group 31B, the casing passage part 64, the casing collected part 65, etc.; however, a further reduction of the exhaust resistance can be achieved by having the structure of the second exhaust port group 31B illustrated in FIGS. 5 and 8. That is, since the Exhaust Gas $Flow_{23}$, $Flow_{26}$, and $Flow_{29}$ do not have the directional components which oppose to each other in the second exhaust port group 31B, even if some of the previous exhaust gas remain inside the second exhaust port group 31B, it will be guided smoothly to the turbocharger 6, without interfering with each other.

8. Effects

According to the engine 2 of this embodiment, in the first exhaust port group 31A, the HP-EGR passage 71 is connected to the exhaust port 31c, and the directing axis $Dr_1$ of the exhaust ports 31g and 31h is directed to the connection of the exhaust port 31c with the port collected part 31i. Thus, in the engine 2 according to this embodiment, as described using FIG. 7, the exhaust gas is introduced into the HP-EGR passage 71 from the exhaust ports 31g and 31h (Flown), as well as from the exhaust port 31c. Therefore, the engine 2 can supply the EGR gas more stably to the intake passage 41.

Moreover, in the engine 2 according to this embodiment, as described using FIGS. 5 and 8, since, in the second exhaust port group 31B, the opening 31v of the port collected part 31p is offset to the +X side of the connected part of the fourth cylinder 3d and the exhaust port 31j (toward the adjacent first exhaust port group 31A), the exhaust gas portions ($Flow_{21}$ to $Flow_{29}$) sent to the port collected part 31p through the respective exhaust ports 31j-31o of the second exhaust port group 31B have the same directional component, without opposing each other. Therefore, in the engine 2 according to this embodiment, the high exhaust efficiency in the second exhaust port group 31B can be secured.

Therefore, the engine 2 according to this embodiment can stably supply the EGR gas to the intake passage 41, while suppressing the reduction in the exhaust efficiency.

In the engine 2 according to this embodiment, the opening 31u of the port collected part 31i in the first exhaust port group 31A is formed substantially at the center in the plan view in the Z-directions. In other words, as described using FIGS. 5 and 6, the opening 31u of the port collected part 31i is formed on the −Y side of the connected part of the exhaust port 31f to the second cylinder 3b. Thus, in the first exhaust port group 31A, the exhaust gas (Flow$_1$ to Flow$_3$) sent through the exhaust ports 31c and 31d, the exhaust gas (Flow$_5$ and Flow$_6$) sent through the exhaust ports 31e and 31f, and the exhaust gas (Flow$_7$ to Flow$_9$) sent through the exhaust ports 31g and 31h outflows to the port collected part 31i, while having mutually different directional components. The exhaust gas portions (Flow$_7$ to Flow$_9$) sent through the exhaust ports 31g and 31h have the directional component directed to the connection of the exhaust port 31c, to the port collected part 31i (i.e., the component directed to the +X side). In the first exhaust port group 31A, by utilizing the directional component of exhaust gas (Flow$_7$ to Flow$_9$) directed to the exhaust port 31c, the exhaust gas can be sent to the HP-EGR passage 71 from the exhaust ports 31g and 31h, as well as from the exhaust port 31c.

In the engine 2 according to this embodiment, the ECU 10 executes the fuel injection in the order of the first cylinder 3a=>the fifth cylinder 3e=>the third cylinder 3c=>the sixth cylinder 3f=>the second cylinder 3b=>the fourth cylinder 3d. In other words, since the ECU 10 according to this embodiment executes the control of the fuel injection so that the fuel is injected alternately with time to the first cylinder 3a to the third cylinder 3c belonging to the first cylinder group 3A, and the fourth cylinder 3d to the sixth cylinder 3f belonging to the second cylinder group 3B, the exhaust interference is reduced and the higher exhaust efficiency is achieved.

Although a detailed illustration is omitted in FIGS. 1 to 8, a water jacket is formed in the cylinder head 31. Thus, in this embodiment, the exhaust gas discharged from the cylinders 3a-3f is cooled by using the water jacket (not illustrated) formed in the cylinder head 31 by providing the first exhaust port group 31A and the second exhaust port group 31B to the cylinder head 31. Moreover, the engine 2 can be downsized overall, compared with the conventional form in which exhaust pipes are sequentially collected outside the cylinder head.

In the engine 2 according to this embodiment, since the exhaust gas sent through the first exhaust port group 31A is sent to the casing collected part 65 (collective exhaust-pipe part) through the casing passage part 63 (first exhaust-pipe part), and the exhaust gas sent through the second exhaust port group 31B (second exhaust passage group) is sent to the casing collected part 65 through the casing passage part 64 (second exhaust-pipe part), the exhaust gas portions are rectified in their flow directions by the casing passage parts 63 and 64, and are then sent to the casing collected part 65, thereby improving the exhaust efficiency.

Since the engine 2 according to this embodiment is provided with the turbocharger 6, the kinetic energy of the exhaust gas can be collected to improve the efficiency.

In the engine 2 according to this embodiment, the center axis Ax$_{64}$ of the casing passage part 64 connected to the second exhaust port group 31B is connected to the casing collected part 65 so as to linearly extend as compared with the center axis Ax$_{63}$ of the casing passage part 63 connected to the first exhaust port group 31A. Thus, in this embodiment, the exhaust gas discharged through the second exhaust passage group 31B can be led to the turbine 62 of the turbocharger 6 with high efficiency. Therefore, the engine 2 according to this embodiment achieves a higher efficiency.

In the engine 2 according to this embodiment, the HP-EGR passage 71 is selectively connected to the exhaust port 31c of the first exhaust port group 31A, and is not connected to the second exhaust port group 31B. Thus, in the first exhaust port group 31A to which the HP-EGR passage 71 is connected, the exhaust gas sent through the second exhaust port group 31B is sent to the downstream side (toward the turbine 62 of the turbocharger 6) with a low resistance, while stably supplying the EGR gas to the intake passage 41, by having the exhaust ports 31g and 31h, for example, as illustrated in FIG. 6. Therefore, the engine 2 according to this embodiment stably supplies the EGR gas to the intake passage 41, while suppressing the reduction in the exhaust efficiency.

In the engine 2 according to this embodiment, the exhaust port 31c of the first exhaust port group 31A is disposed at the opposite side of the exhaust ports 31g and 31h of the same group in the X-directions (the lineup direction of the exhaust ports 31c-31h). That is, the exhaust port 31c is disposed at the most +X side among the first exhaust port group 31A, while the exhaust ports 31g and 31h are disposed at the most −X side among the same group. Thus, the part (Flow$_{11}$) of the exhaust gas from the exhaust ports 31g and 31h (Flow$_7$ to Flow$_9$) efficiently outflows through the exhaust port 31c (flowing backwards) to the HP-EGR passage 71. Therefore, the engine 2 according to this embodiment supplies the EGR gas more stably to the intake passage 41.

As described above, the engine 2 according to this embodiment stably supplies the EGR gas to the intake passage 41, while suppressing the reduction in the exhaust efficiency.

Modification

Figure 9:
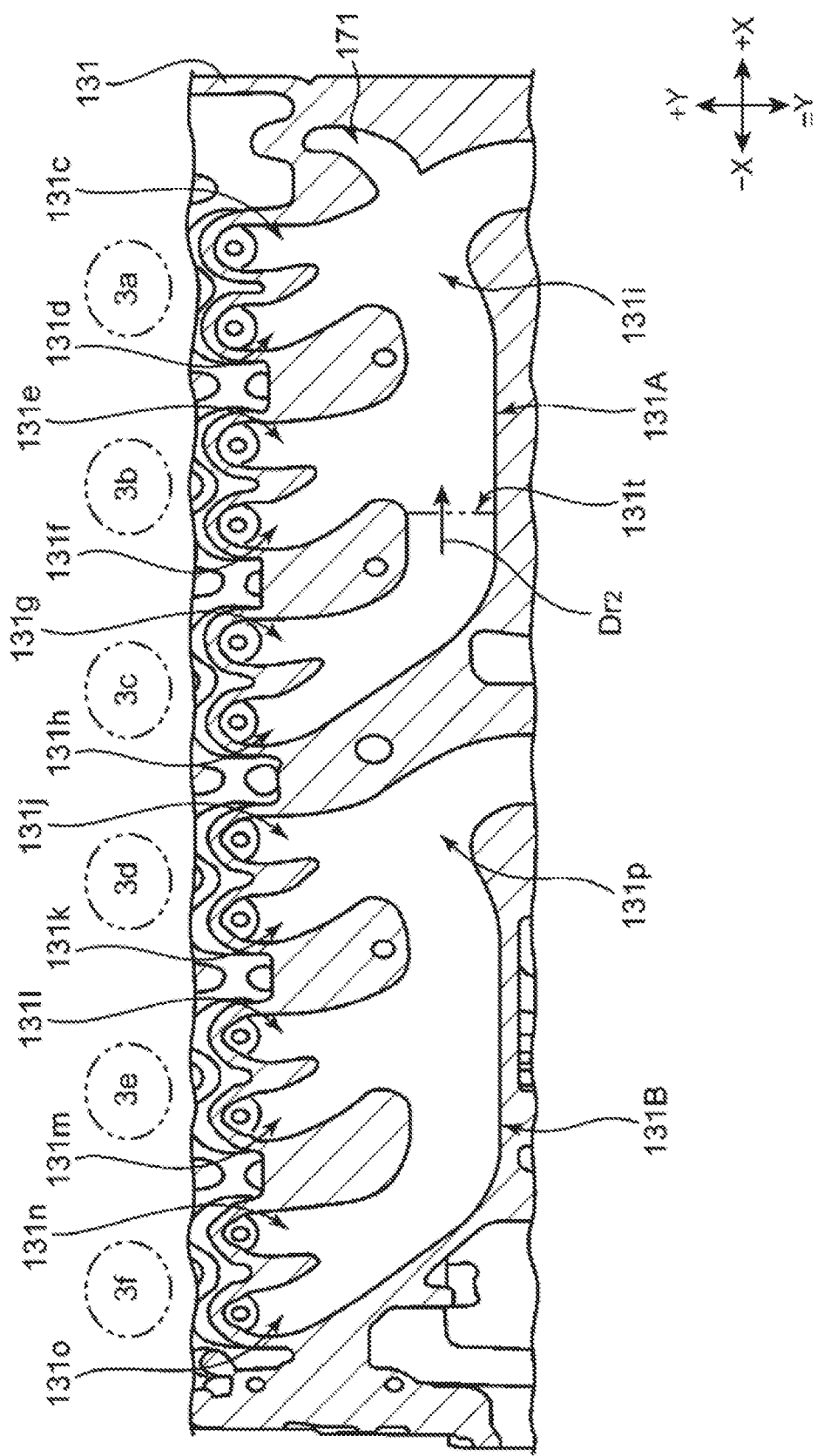
FIG. 9 is a cross-sectional view schematically illustrating an exhaust port structure in the cylinder head according to one modification.

A structure of an engine according to one modification is described using FIG. 9. FIG. 9 is a schematic cross-sectional view corresponding to FIG. 5 used in the previous embodiment. Note that in the following description, redundant description of equivalent elements to those of the previous embodiment may be omitted.

As illustrated in FIG. 9, also in the engine according to this modification is provided with an engine body having a first cylinder 3a to a sixth cylinder 3f lined up in the X-directions. In addition, a cylinder head 131 of the engine body according to this modification also has a first exhaust port group 131A as the first exhaust passage group, and a second exhaust port group 131B as the second exhaust passage group.

The first exhaust port group 131A has an exhaust port 131c (independent exhaust passage part) and an exhaust port 131d (independent exhaust passage part) connected to the first cylinder 3a, an exhaust port 131e (independent exhaust passage part) and an exhaust port 131f (independent exhaust passage part) connected to the second cylinder 3b, and an exhaust port 131g (independent exhaust passage part) and an exhaust port 131h (independent exhaust passage part) connected to the third cylinder 3c. The first exhaust port group 131A also has a port collected part 131i (collective exhaust passage part) where the exhaust ports 131c-131h are collected.

The second exhaust port group 131B has an exhaust port 131j (independent exhaust passage part) and an exhaust port 131k (independent exhaust passage part) connected to the fourth cylinder 3d, an exhaust port 131l (independent exhaust passage part) and an exhaust port 131m (independent exhaust passage part) connected to the fifth cylinder 3e, and an exhaust port 131n (independent exhaust passage part) and an exhaust port 131o (independent exhaust passage part) connected to the sixth cylinder 3f. The second exhaust port group 131B also has a port collected part 131p (collective exhaust passage part) where the exhaust ports 131j-131o are collected.

Also in this modification, the port collected part 131i of the first exhaust port group 131A is connected to the casing passage part 63 of the turbocharger 6, and the port collected part 131p of the second exhaust port group 131B is connected to the casing passage part 64 of the turbocharger 6. This structure is the same as the previous embodiment.

Also in this modification, an opening of the port collected part 131p in the second exhaust port group 131B (a part connected to the casing passage part 64) is disposed so as to be offset to the +X side (toward the adjacent first exhaust port group 131A) of a connected part of the exhaust port 131j to the fourth cylinder 3d.

On the other hand, an opening of the port collected part 131i in the first exhaust port group 131A (a part connected to the casing passage part 63) is disposed so as to be offset to the +X side (away from the adjacent second exhaust port group 131B) of the connected part of the exhaust port 131c to the first cylinder 3a, unlike in the first exhaust port group 31A according to the previous embodiment.

That is, according to the engine of this modification, in a plan view in the Z-directions, the first exhaust port group 131A and the second exhaust port group 131B have substantially the same shape.

As illustrated in FIG. 9, a HP-EGR passage 171 is connected to the exhaust port 131c of the first exhaust port group 131A. That is, also in this modification, the HP-EGR passage 171 is selectively connected only to the exhaust port 131c.

Moreover, also in this modification, at least a part of the HP-EGR passage 171 is formed within the cylinder head 131. Further, also in this modification, the exhaust port 131c corresponds to the "one of independent exhaust passage parts" in the present disclosure.

The HP-EGR passage 171 is connected to a part near a junction part of the exhaust port 131c to the exhaust port 131d.

Also in the first exhaust port group 131A of this modification, the exhaust ports 131g and 131h are directed at a connection 131t to the connection of the exhaust ports 131c and 131d and the port collected part 131i. That is, also in this modification, a directing axis $Dr_2$ of the exhaust ports 131g and 131h at the connection 131t has a component directed to the connection of the exhaust ports 131c and 131d and the port collected part 131i.

Since the engine according to this modification has the structure of the first exhaust port group 131A and the second exhaust port group 131B as illustrated in FIG. 9, it stably supplies the EGR gas to the intake passage 41, while suppressing the reduction in the exhaust efficiency, similar to the engine 2 applied to the previous embodiment.

Moreover, according to the engine of this modification, since the port collected part 131i of the first exhaust port group 131A is offset to the +X side (away from the adjacent second exhaust port group 131B), similar to the second exhaust port group 131B, the exhaust resistance of the outflowing exhaust gas from the first exhaust port group 131A to the casing passage part 63 is suppressed.

Other Modifications

Although in the previous embodiment and modification, the first exhaust port groups 31A and 131A and the second exhaust port groups 31B and 131B of the cylinder heads 31 and 131 constitute the first exhaust passage group and the second exhaust passage group, respectively, the present disclosure is not limited to this structure. For example, the exhaust passages may be collected outside the cylinder head, and/or the connection of the HP-EGR passage may be located outside the cylinder head.

Although in the previous embodiment, in the first exhaust port group 31A, only the exhaust ports 31g and 31h are directed to the exhaust port 31c, the present disclosure is not limited to this structure. For example, the exhaust ports 31e and 31f may also be directed to the exhaust port 31c.

Although in the above embodiment and modification, the structure in which the two exhaust ports are connected to one cylinder is adopted, the present disclosure is not limited to this structure. For example, other structures in which one exhaust port is connected to one cylinder, and three or more exhaust ports are connected to one cylinder, may also be adopted.

Although in the above embodiment and modification, the engine 2 is provided with a single turbocharger 6 as one example, the present disclosure is not limited to this structure. For example, a naturally aspirated engine without the turbocharger may also be adopted, or an engine with two or more turbochargers may also be adopted, or an engine with an electric supercharger, a mechanical supercharger, etc. may also be adopted.

Although in the above embodiment and modification, the 6-cylinder diesel engine is adopted as one example of the engine body 3, the present disclosure is not limited to this structure. For example, the number of cylinders may be four or five, or may be seven or more. Moreover, the engine may be a gasoline engine, or may be a V-type, W-type, or horizontally opposed engine, without being limited to the in-series engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 Multi-Cylinder Engine
3 Engine Body
3A First Cylinder Group
3B Second Cylinder Group
3a-3f Cylinder
4 Intake System
5 Exhaust System
6 Turbocharger
7 HP-EGR Device
31, 131 Cylinder Head
31A, 131A First Exhaust Port Group (First Exhaust Passage Group)
31B, 131B Second Exhaust Port Group (Second Exhaust Passage Group)
31c-31h, 31j-31o Exhaust Port (Independent Exhaust Passage Part)
131c-131h, 131j-131o Exhaust Port (Independent Exhaust Passage Part)
31i, 31p, 131i, 131p Port Collected Part (Collective Exhaust Passage Part)
31t, 131t Connection
31u, 31v Opening
41 Exhaust Passage
63 Casing Passage Part (First Exhaust-pipe Part)

64 Casing Passage Part (Second Exhaust-pipe Part)
65 Casing Collected Part (Collective Exhaust-pipe Part)
71 HP-EGR Passage (EGR Passage)
$Ax_{63}$, $Ax_{64}$ Center Axis
$Dr_1$, $Dr_2$ Directing Axis

What is claimed is:

1. A multi-cylinder engine, comprising:
an engine body having a first cylinder group comprised of a first plurality of cylinders disposed adjacent to each other, and a second cylinder group comprised of a second plurality of cylinders disposed adjacent to each other and provided adjacent to the first cylinder group;
a first exhaust passage group having a first plurality of independent exhaust passage parts connected to the first plurality of cylinders of the first cylinder group, respectively, and a first collective exhaust passage part collecting the first plurality of independent exhaust passage parts at downstream ends in an exhaust gas flow direction, and having an opening at the downstream side in the exhaust gas flow direction;
a second exhaust passage group having a second plurality of independent exhaust passage parts connected to the second plurality of cylinders of the second cylinder group, respectively, and a second collective exhaust passage part collecting the second plurality of independent exhaust passage parts at downstream ends in the exhaust gas flow direction, and having an opening at the downstream side in the exhaust gas flow direction; and
an exhaust gas recirculation (EGR) passage connected at one end to a first independent exhaust passage part of the first plurality of independent exhaust passage parts and connected at the other end to an intake passage,
wherein in a plan view of the first exhaust passage group and the second exhaust passage group in cylinder axis directions, the first exhaust passage group and the second exhaust passage group are disposed adjacent to each other,
wherein in the plan view, a second independent exhaust passage part and a third independent exhaust passage part of the first plurality of independent exhaust passage parts, different from the first independent exhaust passage part to which the EGR passage is connected, are connected to the first collective exhaust passage part so that a first directing axis of the first independent exhaust passage part, a second directing axis and a third directing axis of the second independent exhaust passage part, and a fourth directing axis and a fifth directing axis of the third independent exhaust passage part converge at the first collective exhaust passage part so as to be directed to a connection of the first independent exhaust passage part, the second independent exhaust passage part, and the third independent exhaust passage part to the first collective exhaust passage part,
wherein in the plan view, the opening of the second collective exhaust passage part is offset toward the first exhaust passage group in a lineup direction of the second plurality of independent exhaust passage parts,
wherein the engine body has a cylinder head,
wherein the first exhaust passage group having the first plurality of independent exhaust passage parts and the first collective exhaust passage part are formed in the cylinder head, and
wherein the second exhaust passage group having the second plurality of independent exhaust passage parts and the second collective exhaust passage part are formed in the cylinder head.

2. The multi-cylinder engine of claim 1, wherein in the plan view, the opening of the first collective exhaust passage part is disposed closer to a center in a lineup direction of the first plurality of independent exhaust passage parts, compared with the opening of the second collective exhaust passage part.

3. The multi-cylinder engine of claim 1, wherein fuel is injected alternately over time to the first cylinder group and the second cylinder group.

4. The multi-cylinder engine of claim 1,
wherein the first exhaust passage group and the second exhaust passage group are formed by exhaust ports of the cylinder head.

5. The multi-cylinder engine of claim 4, further comprising an exhaust-pipe part having:
a first exhaust-pipe part connected to the first exhaust passage group in the cylinder head;
a second exhaust-pipe part connected to the second exhaust passage group in the cylinder head; and
a collective exhaust-pipe part collecting the first exhaust-pipe part and the second exhaust-pipe part at downstream ends in the exhaust gas flow direction.

6. The multi-cylinder engine of claim 5, wherein the collective exhaust-pipe part is connected at a downstream end in the exhaust gas flow direction to a turbocharger.

7. The multi-cylinder engine of claim 6, wherein the second exhaust-pipe part is formed so that a central path thereof extending to the collective exhaust-pipe part is more linear than a central path of the first exhaust-pipe part.

8. The multi-cylinder engine of claim 1, wherein in the plan view, the first independent exhaust passage part is disposed farther from the second exhaust passage group, and the second independent exhaust passage part is disposed closer to the second exhaust passage group.

9. The multi-cylinder engine of claim 1, wherein the opening of the second collective exhaust passage part is connected to a casing passage of a turbocharger.

10. The multi-cylinder engine of claim 1,
wherein the engine has six cylinders,
wherein the first cylinder group comprises three cylinders, and
wherein the second cylinder group comprises three cylinders.

11. The multi-cylinder engine of claim 7, wherein the central path of the first exhaust-pipe part and the central path of the second exhaust-pipe part are formed in the turbocharger.

* * * * *